(No Model.)
T. B. JEFFERY.
VELOCIPEDE.
No. 335,590. Patented Feb. 9, 1886.
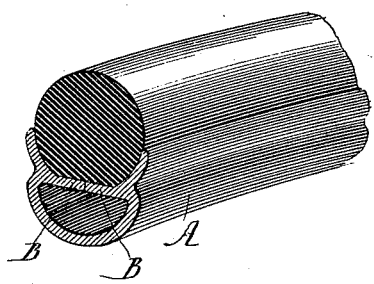
Fig. 1.
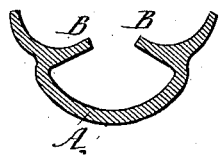
Fig. 2.
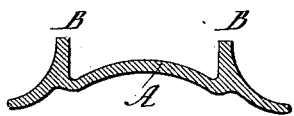
Fig. 3.
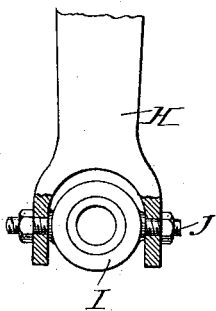
Fig. 8.
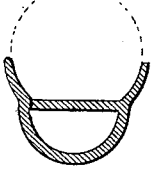
Fig. 6.
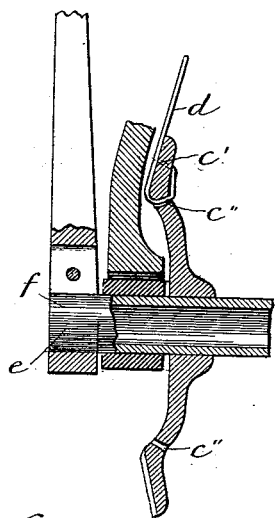
Fig. 4. / Fig. 7.
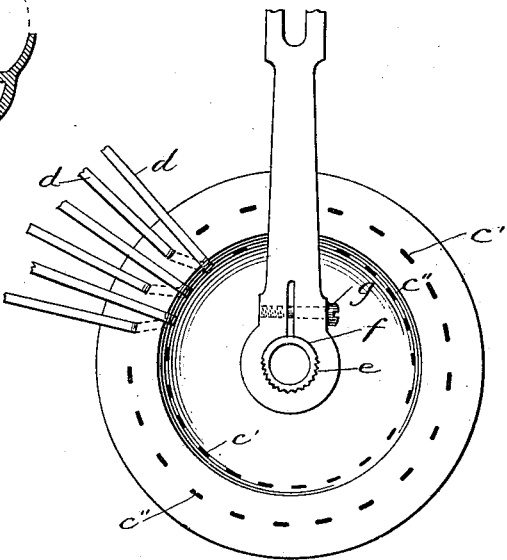
Fig. 5.
Witnesses:
Frank Blanchard
Chas. S. Turos.
Inventor:
Thomas B Jeffery

United States Patent Office.

THOMAS B. JEFFERY, OF RAVENSWOOD, ILLINOIS.

VELOCIPEDE.

SPECIFICATION forming part of Letters Patent No. 335,590, dated February 9, 1886.

Application filed July 31, 1885. Serial No. 173,123. (No model.)

*To all whom it may concern:*

Be it known that I, THOMAS B. JEFFERY, a citizen of the United States, residing at Ravenswood, in the county of Cook and State of Illinois, have invented certain new and useful Improvements in Velocipedes, of which the following is a specification.

My invention relates to improvements in velocipedes; and it consists in the construction of the rim, hub, axle, and bearing.

The object of my invention is to reduce the weight of the machine and increase its strength, which I accomplish by means of the devices described in the annexed specification, reference being had to the accompanying drawings, in which—

Figure 1 is a section of the rim of the wheel containing a rubber tire; Figs. 2, 3, and 6, sections of the rim; Fig. 4, a section of the hub, axle, and crank; Fig. 5, an end view of the latter; Figs. 7 and 8, side and end views of the bearing and fork end.

In carrying out my invention I employ for the rim a band of metal having a section similar to that shown at Fig. 3—that is, a strip of steel, A, having a rib or ribs, B B, projecting out from one of its sides and running parallel with its edges. This strip is by a suitable machine bent into the form Fig. 2 and afterward Fig. 1. The edges B B, where they come together under the rubber tire, may then be united by brazing or other means, or they may be left unjoined if the greatest strength is not desired. In this way is produced a web that materially stiffens the rim, enabling me to employ a light gage of metal and obtain a great degree of strength. If the strip of metal A is formed with one rib, it must be of greater depth to cross the space below the rubber tire, and the joint to be brazed formed on one side, as at Fig. 6. The manufacture of this form is, however, more difficult, and therefore less desirable, than the method described previously.

The rim is joined to the hub by wire spokes of any desirable pattern. I prefer, however, wire rolled to an oval or ribbon shape, having their outer ends secured to the rim and at their inner ends placed through apertures in the hub that conform to the shape of the wire. The apertures in the hub are formed in its face or about at right angles to the direction the spoke $d$ lies when it is secured to the rim, and to form the greatest angle possible between the spokes from each hub I make them all lie on the outer face or side. This requires an aperture for each spoke, being double the number usually employed with wheels whose spokes enter the side of the hub-flange.

To avoid weakening the hub-flange by the double number of holes, I arrange them in two concentric circles, $c'$ and $c''$, allowing in this way ample material for my purpose between each hole.

For the purpose of lightening the axle and crank, I employ for the former steel tubing, and for the latter I provide a securer means of fastening it, enabling me to use a smaller boss on the crank or entirely dispense with it. This I do by forming on the axle a series of grooves and ridges longitudinally, an end view of which is shown at $e$, Fig. 5, and in the aperture of the crank corresponding longitudinal ridges and grooves. The grooves and ridges mentioned need not be entirely round the axle, and I prefer to leave them off near the part which may be most contracted, as at $f$. Various means for contracting the aperture or expanding the shaft may be employed, one of the simplest being a clamping-screw at $g$. In this way I avoid weakening the axle by forming the usual keyway and secure the crank quite as well or better. If, however, the crank forms part of the bearing, or for other reasons contracting the aperture would interfere with its usefulness as such, I expand the axle and provide some means—as, for instance, a taper screw—for the purpose. The former arrangement leaves the axle stronger; but the latter must be used with some varieties of bearings. The axle is supplied with a suitable sleeve or bearing-case, I, to form a bearing. This is joined to the fork ends H by journals J. These project at right angles on each side of the axle about horizontally across its center, and are held to the fork ends by screws and nuts on the threaded ends of the journals, clamping the bearing to the yoke, which forms part of the fork end. The yoke has apertures across its two extremities, and the bearings have shoulders adapted to fit against the inner sides of the yoke, and they may be either flat or more or less tapered for this purpose, and constructed so that they may be drawn with the proper degree of tightness against the yoke and adjusted to line correctly with the axle.

I claim as my invention—

1. A metallic wheel-rim having the material at the side of its center and between such center and its edge thickened into a web or bridge which by crossing the space above such center connects one side of the rim with the other, for the purpose described, substantially as set forth.

2. The metallic wheel-rim having a longitudinal ridge or ridges on one or both sides of its center and between its center and its edge forming a base for the rubber tire and a web to unite the two opposite sides, substantially as set forth.

3. In combination with a series of spokes placed against the outer face of the hub, a double series of holes, one of which is concentric with the other, substantially as and for the purpose described.

4. In a velocipede-axle provided with longitudinal ridges and grooves, and cranks similarly provided with grooves and ridges, means for clamping one to the other, for the purpose described, substantially as set forth.

5. A metallic wheel-rim of practically a U-shaped section, produced from a strip whose edges form the two upper terminations of the U, and a portion about midway between its edges or terminations and its base formed into a rib or ribs projecting inward and connected to the opposite side of the U, substantially as and for the purpose described.

THOS. B. JEFFERY.

Witnesses:
R. PHILIP GORMULLY,
CHAS. S. NEEROS.